(No Model.)
G. H. DIPPO.
CAR STOP.
No. 541,784.          Patented June 25, 1895.
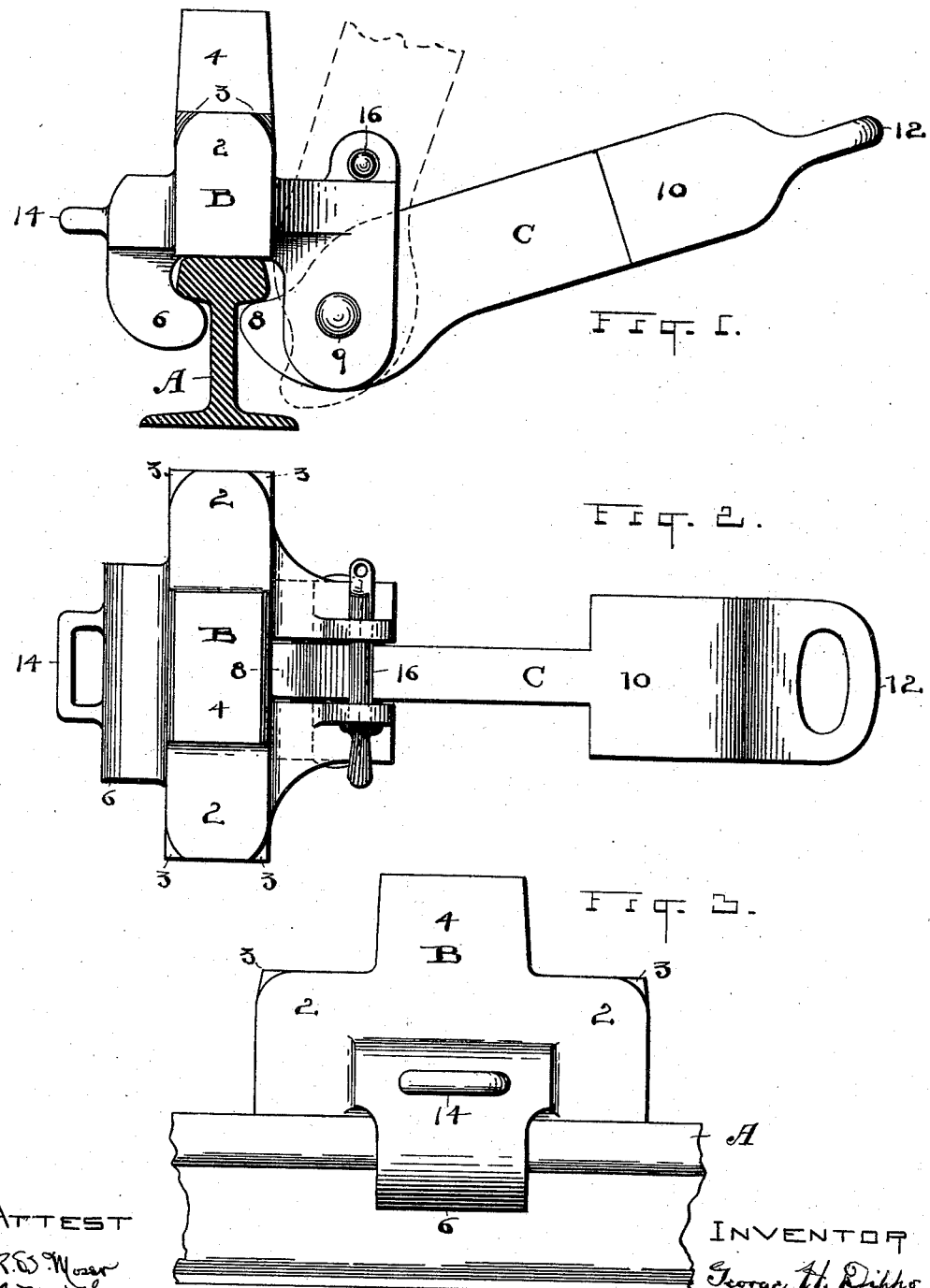

UNITED STATES PATENT OFFICE.

GEORGE H. DIPPO, OF CHAGRIN FALLS, OHIO.

CAR-STOP.

SPECIFICATION forming part of Letters Patent No. 541,784, dated June 25, 1895.

Application filed February 6, 1895. Serial No. 537,499. (No model.)

*To all whom it may concern:*

Be it known that I, GEORGE H. DIPPO, a citizen of the United States, residing at Chagrin Falls, in the county of Cuyahoga and State of Ohio, have invented certain new and useful Improvements in Car-Stops; and I do hereby declare that the following is a full, clear, and exact description of the invention, which will enable others skilled in the art to which it appertains to make and use the same.

My invention has reference to car stops, and the invention consists in a car stop adapted more especially for use on switches in car yards, or on side tracks where cars are laid up temporarily to be loaded or unloaded, or the like, and while said stop is intended to be used as a "chuck" for a car wherever it may be located, it is particularly adapted for use on tracks or switches having inclination or grade, and where without a stop of some kind as a precaution, aside from the brake, there is ever present danger that a car will become released from its holdings and run precipitately down onto the main track or, perhaps, off the end of the track in the opposite direction. Shippers who have switches from the main line to their own establishments, and frequently on very decided and extended grades, and who are responsible for loss from "wild" cars, are especially in need of some good and convenient stop, which can easily be moved from place to place and is reliable as a stop for the car, and cannot be injured by use nor be tampered with or removed by mischievous or malicious persons.

In the accompanying drawings Figure 1 is a side elevation of my improved device, shown as engaged on a track rail, and also showing the counterweighted lever in dotted lines in the position it assumes when the lock is removed. Fig. 2 is a plan view of the device with the parts in the same relation as seen in Fig. 1. Fig. 3 is an elevation of the body of the stop looking in from the left of Fig. 1 and showing a section of rail on which it is resting.

A represents a section of an ordinary railway rail, and B the body of the stop. This body has certain features of construction peculiar to itself, and all of which are essential to the effectual and successful operation of my invention. Thus the said body has an elongated portion —2—, having the depth relatively, of the rail A, or thereabout, and of rectangular outline except at the corners —3—, where it is purposely rounded to avoid possible engagement of the flange of the car wheel. This part —2— therefore, is the immediate part relied on for stopping the car, and the wheel simply engages on said part —2— and generally needs nothing more, especially if the car be at rest and the stop is used in blocking the wheel; but in case the stop be used apart from the car and certain momentum is attained by the car as it reaches the stop, the part —2— may not be sufficient alone to stop the car though it may very materially check its progress. In that case the central post or projection —4— is brought into requisition, and so if a car rides up on stop —2— it will next encounter the post —4— and this will serve to bring the car to a halt whatever else may follow; that is, if the car be under such headway that the destruction of something is imminent or unavoidable if it goes ahead, it will be found that this stop will either stop the car then and there on the track or it will throw it off the track, which is the next best thing to do especially as the stop has been placed with reference to one result or the other.

Now, in order that the stop may be fixed on the rail and be held there until purposely removed, the body B has a jaw —6— integral therewith to engage under one side of the tread of the rail, while the counterweight lever C has its jaw or bite —8— engaging the other side. This lever is pivoted on pivot pin —9— and is counterweighted at its extremity —10— to make an effectual or sufficient grip on the rail. The sufficiency of this grip has been determined by practical test in operation. Ordinarily the stop is meant to be held against sliding and the weighted lever contributes to this result, but in case a loaded car under speed strikes the stop it will not do to have the stop absolutely immovable because it would certainly work injury to the car even if it should stop it; but by having the grip of the stop on the rail such that a sudden and severe contact of a car wheel will move the stop somewhat, and cause it to stop and start a few times in succession under the crowding pressure of the wheel, the severity of an absolutely fixed and impassible stop is overcome and enough relief is afforded to ordinarily prevent breakages. In such a slight movement of the stop the weighted lever would naturally vibrate somewhat under the strain and let go and catch again quickly and permit a little movement of the stop each time.

The extremity of the lever has a handle loop —12—, and the jaw —6— has a handle portion —14—. To take the stop off the rail the lever C is raised to about the position in dotted lines, Fig. 1, and it is prevented from accidental or other removal by bolt —16— which may have a lock of any suitable kind to keep it in place.

The stop is interchangeable on the track so as to be used on either rail, and is convenient to be carried from place to place as well as absolutely reliable in stopping a car; that is, no car can pass this stop and remain on the track. It will either stop or it will leave the track at one side and be ditched. The stop is intended to have one effect or the other.

I claim—

1. A car stop constructed to be attached to a rail and having a projecting shoulder to meet the tread of the wheel and adapted to act as an initial chock to the car wheel and a stud on a plane above said shoulder and in a different vertical plane therefrom, substantially as set forth.

2. A car stop, having the shouldered part —2— adapted to act as an initial chock to the car wheel and a projection or stud —4— above the same, and means to temporarily hold the stop on a rail, substantially as set forth.

3. The car stop described, consisting of the part B having projections —2— and —4— on different planes and a fixed jaw at one side and a weighted pivoted lever on the other side having a jaw to engage the rail, substantially as set forth.

4. The part B provided with projections —2— and —4— and the jaw —6—, in combination with the pivoted engaging lever C and the means to lock the lever and prevent removal of the stop, substantially as set forth.

5. A car stop, constructed to be attached to a rail and having a projecting part —2— to meet the tread of the wheel and adapted to act as a chock to the car wheel, and a jaw —6— to engage under the edge of the rail, in combination with the pivoted counterweighted lever —C— opposite said jaw, and means to lock said lever in engaging position, substantially as set forth.

Witness my hand to the foregoing specification this 30th day of January, 1895.

GEORGE H. DIPPO.

Witnesses:
EMMA J. WILMOT,
E. P. WILMOT.